April 16, 1957   B. EDWARDS   2,788,829
PLASTIC NUT HAVING FRUSTO-CONICAL BORE AND LOCKING PORTION
Filed May 4, 1955
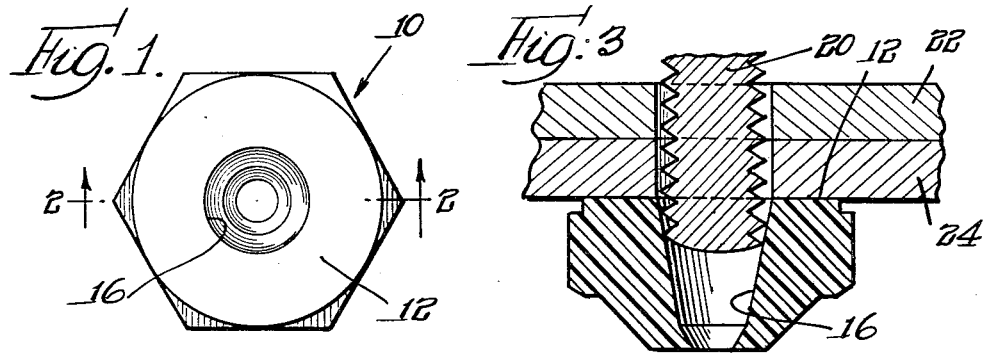
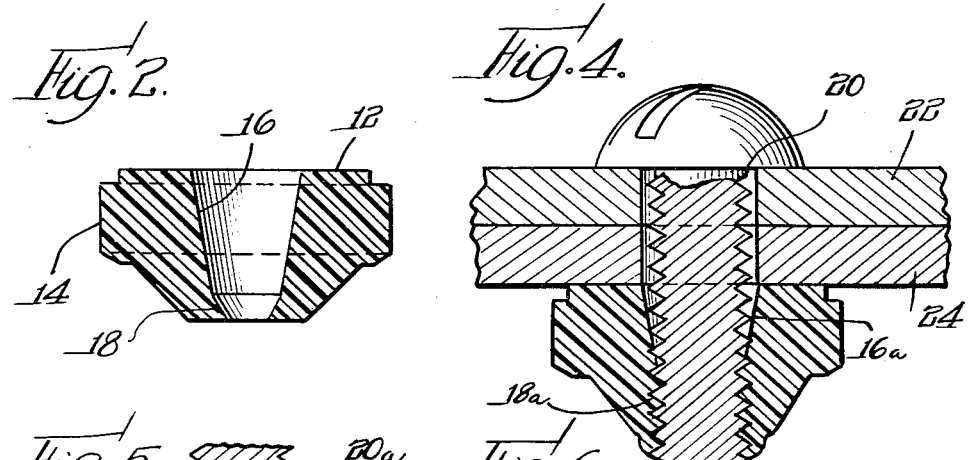
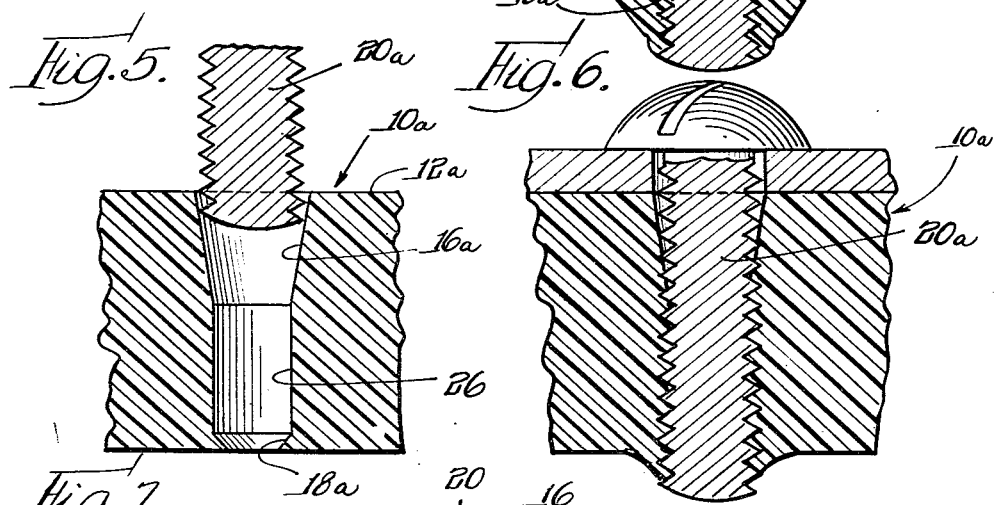
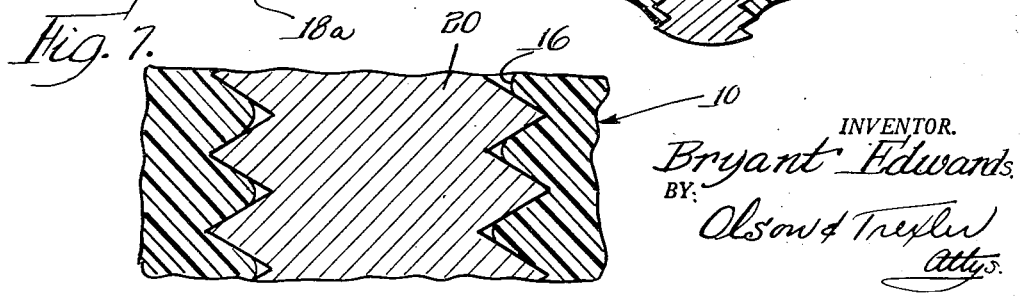
INVENTOR.
Bryant Edwards
BY Olson & Trexler
Attys.

United States Patent Office 2,788,829
Patented Apr. 16, 1957

2,788,829

PLASTIC NUT HAVING FRUSTO-CONICAL BORE AND LOCKING PORTION

Bryant Edwards, Oak Park, Ill., assignor to Illinois Tool Works, Chicago, Ill., a corporation of Illinois Application May 4, 1955, Serial No. 505,956

2 Claims. (Cl. 151—7)

The present invention relates to a novel fastening device, and more particularly to a novel nut-like member formed from a plastic material and having an unthreaded bore or aperture adapted to receive a threaded member such as a screw.

Unthreaded nut-like members have heretofore been suggested, but certain problems have arisen in connection with the application of a screw member to such prior devices. For example, it has often been relatively difficult to start a screw member into the unthreaded apertures of various previously suggested devices, and difficulty has been encountered in maintaining screw members in axial alignment with such prior devices while the screw members are being advanced through the unthreaded apertures.

It is an important object of the present invention to provide a novel plastic fastener member having an unthreaded aperture adapted to receive a screw member or the like, which fastener member is formed so as to facilitate starting of the screw member into the aperture and so that the screw member will be self-aligning as it is threaded through the aperture.

A further object of the present invention is to provide a novel plastic fastener member of the above described type which is formed so as to engage aggressively a screw member applied thereto for restraining or locking the screw member against unauthorized retrograde movement.

Still another object of the present invention is to provide a novel plastic fastener member having an unthreaded bore or aperture which is constructed so that the fastener member will be formed upon the application thereto of a threaded screw member or the like so as to provide improved resistance to axial stripping of the screw member from the fastener member.

Other objects and advantages of the present invention will become apparent from the following description and the accompanying drawings, wherein:

Fig. 1 is a plan view of a nut-like member embodying the principles of this invention;

Fig. 2 is a sectional view taken along the line 2—2 in Fig. 1;

Fig. 3 is a sectional view showing how the fastener member is initially applied to a screw member;

Fig. 4 is a sectional view showing how the fastener member may be used in connection with a screw member for assembling a plurality of work pieces;

Fig. 5 is a sectional view showing a screw member starting into a fastener member embodying a modified form of the present invention;

Fig. 6 is a sectional view showing a screw member fully assembled with the fastener member of Fig. 5; and Fig. 7 is an enlarged fragmentary sectional view showing how threads are formed in the fastener member upon the application of a screw member thereto.

Referring now more specifically to the drawings wherein like parts are designated by the same numerals throughout the various figures, a fastener member 10 embodying one form of the present invention is shown in Figs. 1 through 4. The fastener member is formed from any suitable plastic material such as nylon which is rigid and yet sufficiently deformable or flowable to have helical thread convolutions impressed therein upon the the application of a screw member or the like thereto.

The nut-like member 10 is provided with a generally radially extending clamping face 12 and a polygonal peripheral surface 14 to which a tool such as a wrench or the like may be applied. In accordance with the present invention the nut member is provided with an axially extending bore which is partially defined by a frusto-conical smooth wall section 16 having a moderate taper, and which is partially defined by a frusto-conical smooth wall section 18 having a greater taper. The wall section 16 is formed so that the diameter of its larger end at the clamping surface 12 is greater than the outside diameter of the threads on a screw member 20 to be applied to the nut member, while the diameter of the smaller end of the wall section 16 is less than the outside diameter of the screw threads as shown in Figs. 3 and 4. The diameter of the larger end of the wall section 18 is substantially equal to the smaller end diameter of the section 16, and the smaller end diameter of the wall section 18 is less than the inner diameter of the screw threads for the purpose set forth below.

In the nut or securing member 10 shown for the purpose of illustrating the present invention the included cone angle of the wall section 16 is about 20°, and the wall section 16 is preferably formed so that the included angle is substantially within the range of about 15° to 20°. It has been found that when the wall section 16 is formed in this manner the screw member may be easily started into threaded engagement with the wall section 16 and the wall section will maintain the screw member in axial alignment with the aperture. By "starting" it is meant the initial impression of a thread segment in the wall section 16 by the screw member rather than the mere initial insertion of the screw member into the enlarged mouth of the wall section 16. It has been found that if the included cone angle of the wall section 16 is substantially above 20°, for example about 30°, it is virtually impossible to start the screw member into the aperture. Furthermore, if an included cone angle between about 20° and 30°, such for example as 25° is used, it is relatively difficult to start the screw member, and once started, it is difficult to maintain the screw member in axial alignment with the aperture and the screw member will often run through the nut member at an angle to the axis of its aperture. On the other hand, included cone angles of less than about 15° do not materially improve the starting and self-aligning characteristics of the nut member and have the disadvantage of providing less thread engagement since the threads on the screw will not project to their full depth into the plastic material as quickly or until they are spaced farther from the clamping surface 12.

The manner of applying the screw member and fastener or nut member to a pair of work pieces 22 and 24 is shown in Figs. 3 and 4. The end of the screw member is, of course, first inserted into the enlarged end of the nut member aperture as shown in Fig. 3 and then the screw member and nut member are rotated relative to each other. As the screw member advances through the nut member aperture the screw threads impress complementary threads in the wall section 16 and heat generated by this action causes the plastic material to flow into the screw threads as shown in Fig. 7. Upon advancement of the screw into the aperture portion provided by the wall section 18, the nut member portion surrounding the wall section 18 is expanded as shown in Fig. 4, and the inherent resiliency of the plastic material causes the thread convolutions formed in the wall section 18 to grip the screw aggressively and lock the screw against unauthorized retrograde movement. In addition it should be noted that the end of the nut member around the wall section 18 is axially extended by the screw member so as to increase the length of the thread convolutions engaging the screw, and thereby improve the resistance to axial stripping of the screw member from the nut member.

Figs. 5 and 6 show a modified form of the present invention which is similar to the above described structure as indicated by the application of identical reference numerals with the suffix *a* added to corresponding elements. While only a portion of the fastener member 10*a* is shown it may be in the form of a nut or it, as well as the above described embodiment, may be any desired apertured work piece adapted to receive a screw member. This embodiment differs in that the axial thickness or length of the fastener member 10*a* is substantially greater than the axial length of the above described fastener member 10, and in that a cylindrical wall section 26 is disposed between the axially spaced aperture wall sections 16*a* and 18*a*. The cylindrical wall section 26 has a diameter which is less than the outside diameter of the screw threads as shown in Figs. 5 and 6, and is the same as the diameter of the small end of the wall section 16*a* and the large end diameter of the wall section 18*a*. This structure materially increases the holding power of the fastener member since the axial extent of the engagement between the fastener member and the screw threads is increased.

While the preferred embodiments of the present invention have been shown and described herein, it is obvious that many structural details may be changed without departing from the spirit and scope of the appended claims.

The invention is claimed as follows:

1. An unthreaded plastic fastener member for receiving a threaded screw member or the like, comprising an uninterrupted body having an aperture therein, said body presenting a substantial surface traversing the axis of said aperture and adapted to serve as a clamping surface of said fastener, said aperture including a generally frusto-conical, substantially smooth wall section having a moderate included angle and defining a first portion of said aperture, the base of the cone of said wall section being of a diameter greater than the outside thread diameter at the entering end of a complementary screw member to be associated therewith and defining the aperture intersecting the clamping surface of the fastener, and the opposite end of the cone of said wall section being of a diameter less than the outside thread diameter at the entering end of the complementary screw member, a second portion of said aperture presenting a frusto-conical wall section having a greater apical angle than said first portion whose largest diameter is approximately equal to and disposed to face the smaller diameter of said first aperture portion, a portion of the outer wall of said body located in the vicinity of said clamping surface being provided with a plurality of tool engaging surfaces adapted to cooperate with a complementary shaped tool to facilitate the mounting of said fastener on the threaded screw member, and a second portion of the outer wall of said body located beyond said tool engaging surfaces extending to the end of said fastener remote from the clamping surface and having a reduced diameter relative to the diameter through said engaging surfaces whereby the area of reduced diameter permits a predetermined amount of outward distortion as a complementary screw member is associated therewith.

2. A fastener device of the type described in claim 1 wherein the first portion of said aperture extends axially from said clamping surface into the area defined by the second portion of the outer wall which is of reduced diameter, and said second aperture portion being of relatively short axial extent so that aggressive impingement on the complementary screw member is accomplished only after substantial engagement with the wall of the aperture of said fastener thereby assuring initial mounting of the fastener on the screw with facility with a relatively small area provided the effective locking area.

References Cited in the file of this patent
UNITED STATES PATENTS

| | | |
|---|---|---|
| 131,945 | Dunlap | Oct. 8, 1872 |
| 2,088,955 | Hamill | Aug. 3, 1937 |
| 2,545,514 | Erb | Mar. 20, 1951 |